United States Patent [19]
Berthier et al.

[11] Patent Number: 5,175,690
[45] Date of Patent: Dec. 29, 1992

[54] PROCESS FOR MANAGING STORES AND DEVICE FOR CARRYING IT OUT

[75] Inventors: Gérard Berthier, Bordeaux; Jacques Denis, Houilles, both of France

[73] Assignee: Societe Generale pour les Techniques Nouvelles-S.G.N., Saint-Quentin-en-Yvelines, France

[21] Appl. No.: 373,791

[22] Filed: Jun. 29, 1989

[51] Int. Cl.⁵ .................... G06F 15/46; G06K 15/00
[52] U.S. Cl. .................... 364/478; 364/479; 414/273; 414/277; 414/662; 414/783; 235/383
[58] Field of Search .............. 364/478, 479, 564; 235/383; 414/273, 277, 281, 783, 331, 662, 266; 360/71, 92; 312/9, 12; 194/351; 222/251

[56] References Cited

U.S. PATENT DOCUMENTS

| | | | |
|---|---|---|---|
| 3,463,566 | 8/1969 | Powers | 312/223 |
| 4,466,765 | 8/1984 | Mautino | 414/277 |
| 4,478,464 | 10/1984 | Williams | 312/9 |
| 4,561,820 | 12/1985 | Matheny, III et al. | 414/331 |
| 4,679,149 | 7/1987 | Merz | 364/478 |
| 4,692,876 | 9/1987 | Tenma et al. | 364/513 |
| 4,693,373 | 9/1987 | Lamb et al. | 364/478 |
| 4,812,629 | 3/1989 | O'Neil et al. | 235/383 |
| 4,864,438 | 9/1989 | Munro | 360/92 |
| 4,942,954 | 7/1990 | Nesser et al. | 194/351 |
| 4,945,428 | 7/1990 | Waldo | 360/92 |

FOREIGN PATENT DOCUMENTS 0156953 3/1984 European Pat. Off. .
0198402 4/1986 European Pat. Off. .

OTHER PUBLICATIONS

Patent Abstracts of Japan, vol. 10, No. 211, Jul. 24, 1986 "Automatic Warehouse System".
Glazer, S., "Automated Material-Handling Systems Streamline Management of Goods", Mini-micro Systems, vol. 16, No. 10, Sep. 1983, pp. 141-148, Denver, Colo. (see p. 147, lines 9-18).

Primary Examiner—Jerry Smith
Assistant Examiner—Paul Gordon
Attorney, Agent, or Firm—Brumbaugh, Graves, Donohue & Raymond

[57] ABSTRACT

This invention relates to a process for managing stores, in which objects are stored, removed and arranged. Said objects are stored not in accordance with an indexed classification but as a function of their dimensions and of the storage volumes available in the store and, at each instant, their location as well as the location and dimensions of the storage volumes still available are recorded. Said process is advantageously carried out for managing a library, videotheque, discotheque, archives, .... The present invention also relates to a device for carrying out said process.

20 Claims, 3 Drawing Sheets

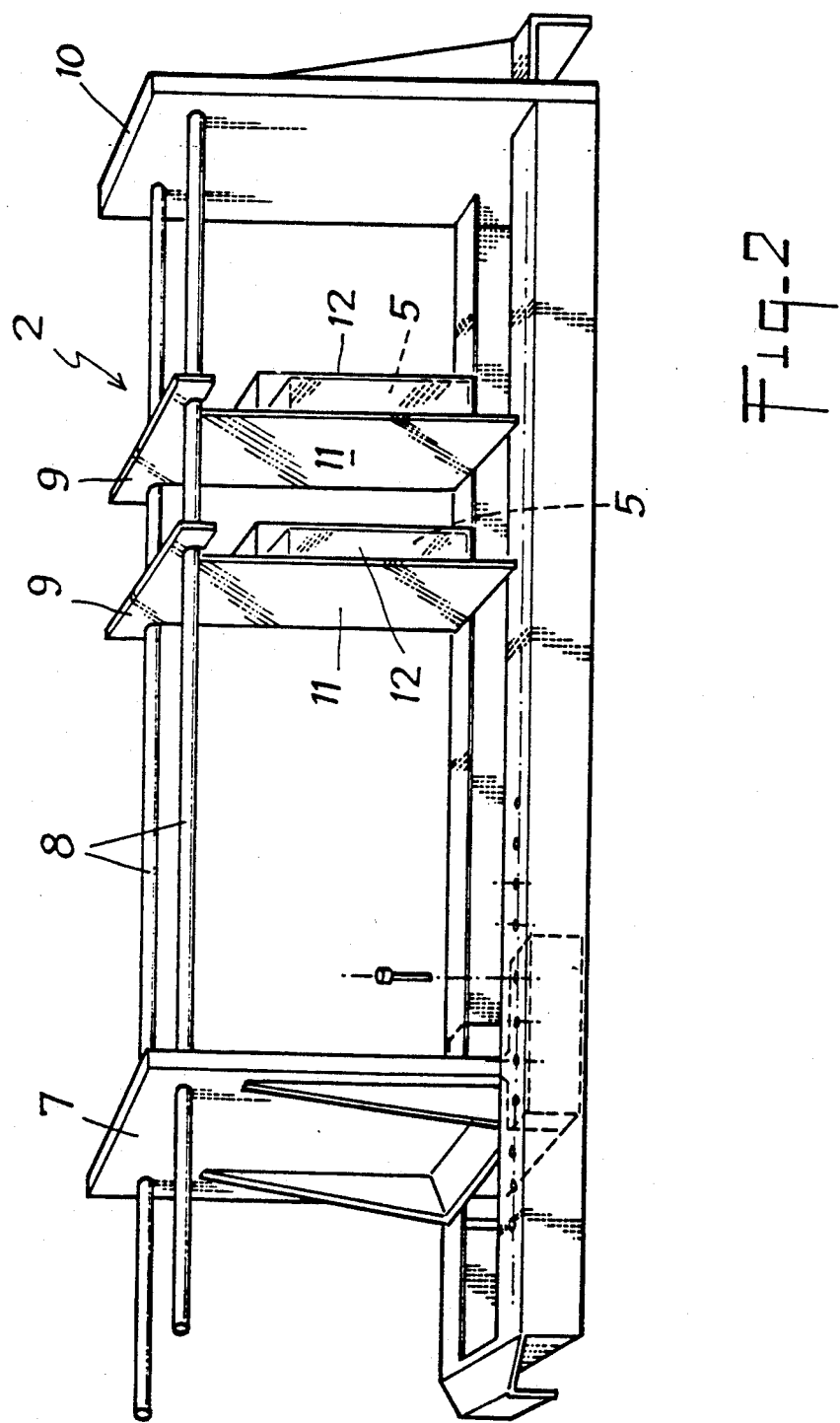

PROCESS FOR MANAGING STORES AND DEVICE FOR CARRYING IT OUT

The present invention relates to a process for managing stores, in which objects are stored, removed and arranged.

Said process is characterized in that said objects are not stored in accordance with an indexed classification.

The invention proposes a dynamic management of stores.

Such management is contrary to the generally accepted principle that each object should be allocated a place. In fact, according to the prior art, an object is allocated a place and said object or the one which replaces it is always put in the same place. In this way is effected the storage of objects taken out temporarily from a store, respecting a relation between said objects and their place in said store. Stores, thus managed, are always in the same order.

On the other hand, the stores managed according to the process of the invention are always in disorder.

In fact, said process of the invention is characterized in that the objects are stored as a function of their dimensions and of the storage volumes available in the store.

Said objects are stored in the "first" free place where they can enter taking their dimensions into account.

According to the process of the invention, after each storage, the location in which the object has been stored as well as the location and dimensions of the storage volumes still available are recorded.

The information necessary for seeking an object in the store and/or for storing another object therein is thus available at any moment.

The location of an object in the store is therefore variable, further to its exits and entries in said store.

It may also vary, without the object leaving the store. For example, to store another object, it may be desired to displace an object already stored in the store.

In another case, at "peak periods", the objects are systematically stored in the "first" location where it is possible to store them: the one which involves the least manipulation, the shortest path, . . . In "slack periods", it may possibly be desired to relocate them in accordance with another sorting algorithm. With this possibility, the location of the object also varies without it leaving the store.

According to the invention, the location of the objects in the store as well as the location and dimensions of the storage volumes still available should therefore be known at each instant.

In this way, the process according to the invention is characterized in that said objects are stored not in accordance with an indexed classification but as a function of their dimensions and of the storage volumes available in the store and in that, at each instant, their location as well as the location and dimensions of the storage volumes still available are recorded.

The process according to the invention may advantageously be carried out in a library, videotheque, discotheque, archives, etc . . .

It may also be employed in a spare parts store.

It allows the physical management of products: books, cassettes, records, documents, mechanical parts, for example.

It will be specified that, in the present specification, the term "store" may designate a whole store, part of a store, and even a storage sub-unit within a store.

The process of the invention may, for example, be carried out for the complete management of a library and/or for the management of sub-units therewithin.

Execution of the process according to the invention, taking into account the number of said products in a store, may rapidly prove fastidious unless data-processing systems are employed.

According to a preferred variant, management of stores according to the process of the invention is computer-assisted.

At any instant, a computer memorizes the dimensions of each of the objects in the store, the location of those which are effectively present in the store as well as the dimensions of the storage volumes available in said store.

Said computer may also control automats which remove and store the objects within the store.

The entries and exits of the object may thus be rendered entirely automatic.

To enter an object in the store, the computer, after having identified it and knowing its dimensions and the data relative to the filling up of the store, locates the different places where it is possible to store it. This is the first sorting algorithm.

If different possibilities are offered, it will select one as a function of at least one other sorting algorithm. For example, storage of the objects may be effected by the shortest path towards the first available places or taking into account their frequency of exit.

Automats are then in a position to conduct and position the object in the selected location.

These same automats are capable of seeking such or such object in the store, as demanded.

According to a variant of the process of the invention, the objects are stored in the store in cases. They may advantageously be manipulated—removed and stored—with said cases.

The shape of said cases may be optimized for handling by automats, by robots.

There may be several objects, preferably of the same nature, per case or one object per case.

The execution of the process according to the invention will be described hereinafter by way of illustration, in a library, where books are stored, removed and arranged.

Said books are advantageously stored in cases, one in each. Said cases are stored in storage units, the library being constituted by an assembly of such storage units.

The location of each book is known, since the storage unit in which it is stored and its position in said storage unit are known. This position may be defined by different types of references. Independently of any reference, it may be defined by the sequence number of the book in the storage unit. This sequence number may be determined from the bottom or front part of the unit.

As indicated above, this sequence number may vary without the book leaving the store. For example, in a storage unit, a book in third position comes into second position if the book in second position is removed, . . .

In such a library "in disorder", the following must be known at each instant:
the size of the books,
the filling of the different units,
the location of the books in the store.

The books are advantageously characterized simply by their thickness. They are all manipulated in the same type of case of which only the thickness is variable.

A library may thus be completely managed by carrying out the process of the invention "on a large scale".

Manipulations therein are advantageously rendered entirely automatic and controlled by computer.

According to other variant embodiments, the process of the invention may be employed for managing a library "on a smaller scale". It may be carried out at the level of parts of the library, and even at the level of storage sub-units of said library . . . This is illustrated hereinafter.

The library may, for example, have been divided into two parts: one part where the so-called "active" books, whose frequency of taking out is greater than a certain threshold, are stored; and one part where the so-called "dormant" books whose frequency of taking out is less than said threshold, are stored. In such a context, the process of the invention may be carried out at the level of each of the two parts of the library or only at the level of the part containing the so-called "active" books, part where the largest number of manipulations are made.

In such a library, storing of the books is carried out in two steps:

the nature of the books to be stored: "active" or "dormant" is previously determined;

if it is question of an "active" book, it is stored by carrying out the process according to the invention, in the "active" part of the library;

if it is question of a "dormant" book, it is stored in the "dormant" part of the library, possibly employing the process of the invention.

The process of the invention may, according to this variant embodiment, therefore be carried out in the two parts of the library (after a preclassification of the book to be stored: "active" or "dormant". . . ). It may be carried out differently. In fact, it will be readily appreciated that complete automatization of the manipulations in that part of the library where the "dormant" books are stored constitutes an unjustified luxury. A library in two parts may therefore advantageously be imagined:

"active" part where the process of the invention is carried out automatically,

"dormant" part where the process of the invention is carried out semi-automatically, with the intervention of an operator, or even completely manually. In this part of the library, it is possible not to carry out the process of the invention and to store the books in conventional manner.

According to this variant of the invention, the operator manipulates a "dormant" book directly, to remove it.

Within the scope of this two-part library, another process of removal and of storing the "dormant" books may be imagined, whereby the "dormant" books to be removed are manipulated singly only in the "active" part. According to this other variant of the invention, the "dormant" book which it is desired to consult is transported from the "dormant" part to the "active" part, in its storage sub-unit (for example drawer). This sub-unit is stored in a sub-part of the "active" part. The "dormant" book is removed and will be re-stored there before its return in the "dormant" part. According to this variant, the process of the invention may be carried out for storing the active books in the active part of the library, for storing the "dormant" book in the storage sub-unit temporarily transferred in the "active" part and for storing said storing sub-unit in the "dormant" part.

This illustrates the fact that the process of the invention may be carried out at different levels and "on a more or less large scale" in the management of a library or any other store.

The present invention also relates to a device for carrying out the process explained hereinabove.

This device advantageously comprises:

a compartmented store in which the objects are stored, at least one robot for gripping said objects, mounted on a transtocker mobile within the store, means for transferring said objects from the store towards the user, and vice versa, and data-processing means capable of storing the data relative to the filling of the store, to the dimensions of the objects and to their location in said store and of controlling said robot and said transfer means to ensure removal and storage of said objects.

This device allows computer-assisted management of a store within which the manipulations of objects are entirely automatic.

When requested by a user, the object is taken out of store and automatically placed at his/her disposal.

The system obviously functions in the sense of returning the object into the store when the user hands it in.

The robot is capable of seeking an object in the store and of connecting it to the transfer means for it to be guided towards the user. In reverse direction, it is capable of disconnecting an object from said transfer means and of placing it in position in the store.

Said transfer means may consist of a roller, chain, belt conveyor . . . They are obviously adapted to the weight and shape of the objects to be transferred.

The computer, at each instant, knows where to find an object in the store (or indicates that it has been taken out) and to find a place in the store for an object to be stored therein.

The store is for example a high store comprising compartments, each of said compartments being adapted to receive a unit for storing the objects to be stored.

If there is one object or one type of object per unit, it will suffice to reference said object by the number or position of its unit or compartment.

It is also possible, according to other variants of the invention, that said storage units be compartmented, each compartment being adapted to receive one object or several objects of the same type.

The or each object is then referenced by the number or the position of its storage unit and by the number or position of its compartment in said storage unit.

There may be several objects of different type in the same unit without the latter being compartmented. Said objects may be referenced by their sequence number in said unit.

According to a variant of the invention, the storage units of the store may present a mobile rear part: Their depth may thus be adjusted and/or the objects that they contain may be moved forwards, filling the empty gaps. The position of the objects in the units is therefore changed. However, they may always be referenced by their sequence number in said units.

In the store, the objects are advantageously stored in cases.

They may be stored singly or several of the same type may be grouped in one case.

The robot advantageously manipulates them with said case.

The storage units constituting the store may be of parallelepipedic shape and present neither a back nor sides, but two bars in their upper part. From these bars are suspended the objects to be stored. They may be suspended therefrom directly if their shape allows this, or if they are provided with appropriate means. More generally, they are suspended via their case.

Said cases advantageously comprise a rigid part, at least in their upper part to which is fixed a supple bag.

The suppleness of the bag enables it to receive objects of different sizes. Its rigid part facilitates gripping by the robot and increases its stability in the storage units.

According to a variant of the invention, the cases do not pre-exist. They are made just before the object is stored in the store.

To that end, said object is passed in an oven where it has a plastic film moulded thereon. It is preferably moulded over with an element forming handle. After moulding, it may also be connected to a handle.

A blister-type packing is thus produced for the object to be stored according to the process of the invention.

Said object is thus protected from dust and is resistant to the aggressive environment: humidity, acidity, U.V., . . .

The invention will be more readily understood on reading the following description with reference to the accompanying drawings, in which:

FIG. 2 shows a storage unit, of the type such as those used in a device according to the invention.

Figure 1:
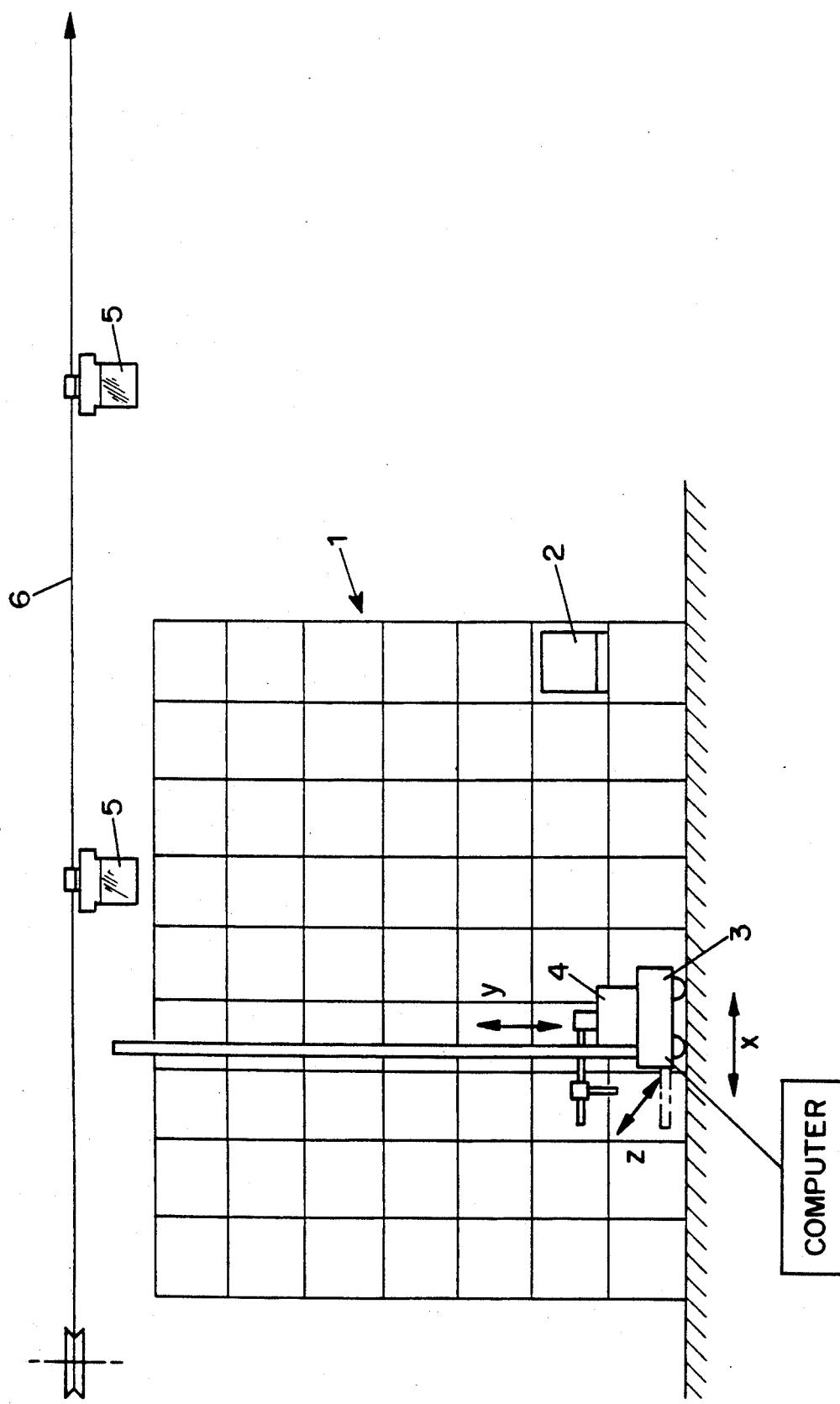
FIG. 1 shows a block diagram of a device according to the invention.

Referring now to the drawings, FIG. 1 shows a high store at 1.

The latter is constituted by a certain number of compartments, each being adapted to receive a storage unit 2 which receives the products to be stored.

Access to these compartments is made with the said of a transtocker 3 which allows a robot 4 to effect the X and Y displacements, i.e. to seek the storage unit Xi Yi which was previously selected. The robot 4 takes out said unit 2 and removes the object 5 which has been requested. Said object 5 is then connected to the conveyor 6 which conducts it towards the user. Switching systems may be provided on the path of said object 5.

In the same way, the conveyor 6 and the robot 4 on the transtocker 3 will place an object 5 in the store 1, at "any" available place.

It will be recalled here that, according to the invention, the store is constantly in "disorder".

The rear part 7 of the storage unit 2 shown in FIG. 2 is mobile. This enables its depth to be easily adjusted.:

Said storage unit 2 is a parallelepipedic cabinet which presents neither a back nor sides.

It presents two bars 8 in its upper part. These bars 8 receive the unitary storage systems or cases 9 for the objects 5.

Figure 3A:
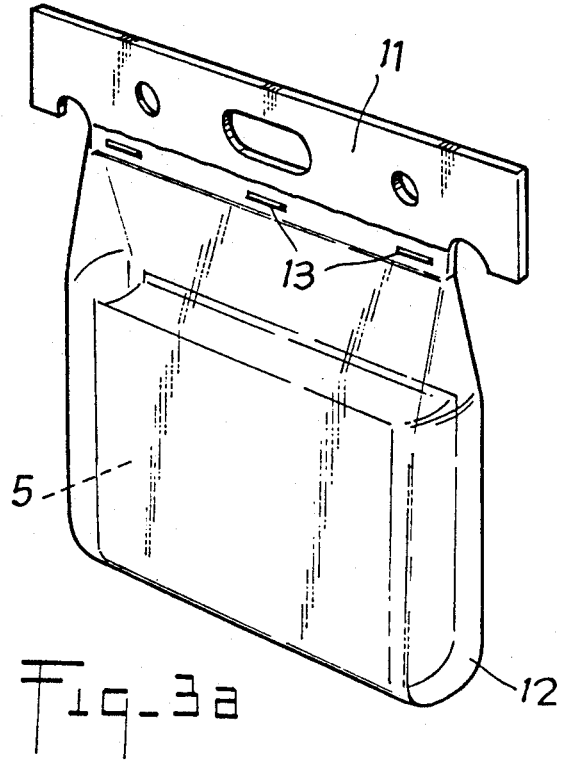
FIGS. 3a to 3c represent different types of unitary storage systems which may be placed in the storage units according to FIG. 2.
Figure 3B:
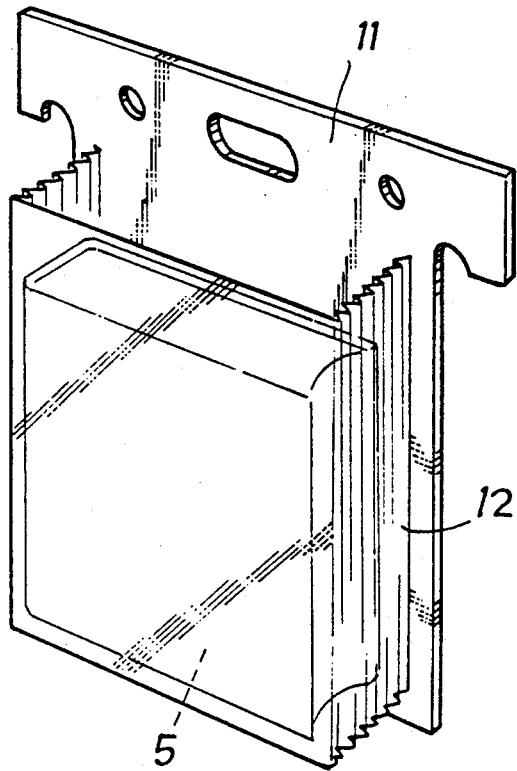
Figure 3C:
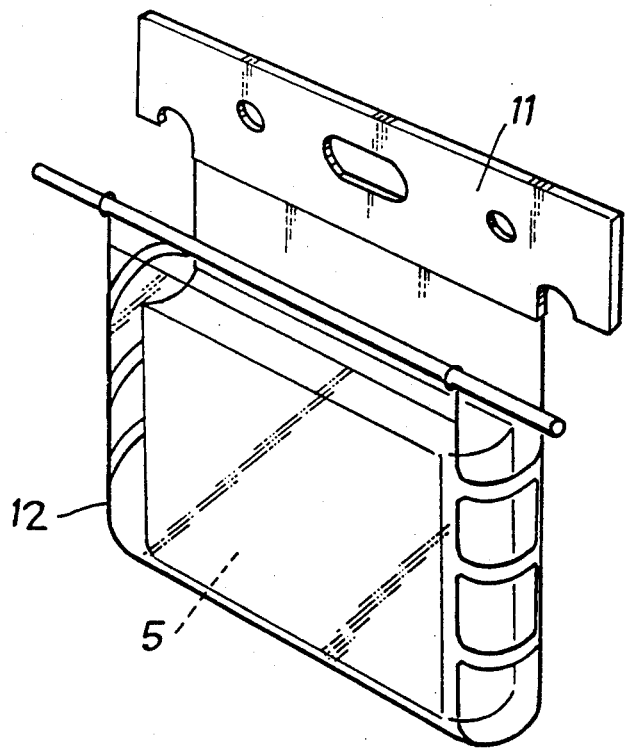

FIGS. 3a to 3c show in detail different types of unitary storage systems 9. Such systems are particularly advantageous for storing books, documents, In such a storage unit, the position of the unitary storage systems—therefore that of the stored products, is not indexed. Said unitary storage systems or cases 9 for the objects 5 are referenced by their sequence number in the unit 2: the first, second, . . . from the bottom or the front part 10 of the unit, which is fixed.

Said unitary storage units 9 comprise a rigid part 11 and a more supple part 12.

The rigid part may be more or less large.

It is located at least in the upper part of the cases 9 and is gripped by the robot 4 when it manipulates the object 5 in its case 9.

The supple part of the cases may be made of fabric, plastics material, paper, . . .

The rigid support may be made of wood, plastics material, . . . It constitutes an insert between the different objects in the storage units of the store.

FIG. 3b shows a case particularly adapted for storing objects of different widths. Its supple part 12 constitutes a gusset. Its rigid part 11 constitutes a perfect insert.

The supple part 12 of the case 9 according to FIG. 3c may be connected to its rigid part 11 by any fastening system to constitute a "closed" case.

The case 9 of FIG. 3a is closed by clips 13.

Said cases 9 are particularly adapted for carrying out the process according to the invention in a library.

Their rigid support, of the same type, is easy to manipulate by the same automatic system. They may therefore coexist in the same store, in the same library.

A library where the books are not stored either by author or by theme, where said books do not have an allocated place, may therefore be managed according to the invention. The use of "phantoms" when said books are taken out is also dispensed with.

It will be noted that, according to the invention, the manipulations to be performed by the robot are extremely simple. It manipulates neither inserts nor "phantoms".

What is claimed is:

1. A process for managing the storage of an object in a storage facility having a plurality of storage sites of differing volume, which comprises:
   (a) identifying the available storage sites in the facility having a volume sufficient to contain the object to be stored;
   (b) selecting a storage site from the identified storage sites using a selection criterion based upon minimizing the amount of unfilled space in he selected storage site, the shortest distance from the object to be stored to the selected storage site, and he frequency with which the object will e taken out of the storage site;
   (c) storing the object in the selected storage site; and
   (d) recording he location of the stored object.

2. Process according to claim 1, characterized in that said objects are stored in cases and in that said objects are removed and stored with said cases. .

3. Process for managing a library, in which books are stored, removed, and arranged, according to claim 1, characterized in that each book is placed i a case and then stored in a storage unit, the location of said book being defined by the identification of said storage unit and by the sequence number of said book in said storage unit.

4. Device for carrying out a process for managing stores, in which objects are stored, removed and arranged, an wherein said objects are stored not in accordance with an indexed classification but according to a sorting algorithm as a function of their dimensions and of the storage volume available in the store and in that, at each instant, their location as well as the location and dimensions of the storage volumes still available are recorded, characterized in that the device comprises:
- a compartmented store in which the objects are stored, each of said compartments being adapted to receive a storage unit for storing said objects,
- at least one robot for gripping said objects, mounted on a transtocker, mobile within the store,
- conveyor means for transferring said objects from the store towards the user, and vice versa,
- and data-processing means capable of selecting the compartment in the store in which an object will e stored based upon minimizing he amount of unfilled space in the selected storage site, the shortest distance from the object to be stored to the selected storage site, and the frequency with which the object will be e taken out of the storage site, storing the data relative to the filling of the store, to the dimensions of the objects and to tailer location in said store and of controlling said robot and said conveyor means to ensure removal ard storage of said objects.

5. Device according to claim 4, characterized in that the store is a high storage comprising compartments, each of said compartments being adapted to receive a unit for storing said objects, said storage unit optionally presenting a mobile rear pat for adjusting the depth of said storage unit.

6. Device according to claim 5 characterized in that the storage units, of parallelepipedic shape, present neither a rear nor sides, but two bars in their upper apart, from which said objects or cases containing said objects are directly suspended.

7. Device according to claim 6, characterized in that said case are o the blister type.

8. Device according to claim 6, characterized in that in that said cases comprise a rigid part at least in their upper part, to which s supple bag is fixed.

9. Device according to claim 5, characterized in that, in the store, said objects are stored in cases 10. Device according to claim 9 characterized in that the storage units, of parallelepipedic shape, present neither a rear nor sides, but two bars in their upper part, from which said objects or cases containing said objects are directly suspended.

11. Device according to claim 10, characterized in that in that is cases comprise a rigid part at least in their upper part, to which a supple bag is fixed.

12. Device according to claim 10, characterized in that said cases are of the blister type.

13. Device according to claim 9, characterized in that in that said cased comprises a rigid part at lest in their upper part, to which a supple bag is fixed.

14. Device according to claim 9, characterized in that said cases are of the blister type.

15. Device according to claim 4, characterized in that said objects are stored in cases.

16. Device according to claim 15, characterized in that said cases comprise a rigid part at least in their upper part, to which a supple bag is fixed.

17. Device according to claims 15, characterized in that said cases are of the blister type.

18. Device according to claim 15, characterized in that the storage units, of parallelepipedic shape, present neither a rear nor sides, but two bars in their upper part, from which said objects or cases containing said objects are directly suspended.

19. Device according to claim 18, characterized in that in that said cases comprise a rigid part at least in their upper part, to which a supple bag is fixed.

20. Device according to claim 18, characterized in that said cases are of the blister type.

* * * * *

UNITED STATES PATENT AND TRADEMARK OFFICE
CERTIFICATE OF CORRECTION

PATENT NO. : 5,175,690

DATED : December 29, 1992

INVENTOR(S) : BERTHIER ET. AL

It is certified that error appears in the above-identified patent and that said Letters Patent is hereby corrected as shown below:

Col. 5, line 42, "said" should read --aid--;

Col. 5 line 64, "documents," should read --documents, ...--;

Col. 6, line 47, "and he" should read --and the--;

Col. 6, line 48, "will e" should read --will be--;

Col. 6, line 57, "placed i" should read --placed in--;

Col. 7, line 20, "tailer location" should read --their location--;

Col. 7, line 25, "high storage" should read --high store--;

Col. 7, line 29, "rear pat" should read --rear part--;

Col. 7, line 34, "apart" should read --part--;

Col. 7, last line, "case are o" should read --cases are of--;

UNITED STATES PATENT AND TRADEMARK OFFICE
CERTIFICATE OF CORRECTION

PATENT NO. : 5,175,690

DATED : December 29, 1992

INVENTOR(S) : BERTHIER ET AL.

It is certified that error appears in the above-identified patent and that said Letters Patent is hereby corrected as shown below:

Col. 8, line 2, delete "in that";

Col. 6, line 64, "an wherein" should read -- and wherein--;

Col. 7, line 12, "will e" should read --will be--;

Col. 7, line 13, "minimizing he" should read --minimizing the--;

Col. 7, line 18, "be e" should read --be--;

Col. 7, line 20, "tailer location" should read --their location--;

Col. 7, line 25, "high storage" should read --high store--;

Col. 7, line 29, "rear pat" should read --rear part--;

Col. 7, line 34, "apart" should read --part--;

Col. 7, last line, "case are o" should read --cases are of--;

UNITED STATES PATENT AND TRADEMARK OFFICE
CERTIFICATE OF CORRECTION

PATENT NO. : 5,175,690

DATED : December 29, 1992

INVENTOR(S) : BERTHIER ET AL.

It is certified that error appears in the above-identified patent and that said Letters Patent is hereby corrected as shown below:

Col. 8, line 2, delete "in that";

Col. 8, line 3, "s supple" should read --a supple--;

Col. 8, line 5, "cases" should read --cases.--;

Col. 8, line 12, delete "in that";

Col. 8, line 12, "is cases" should read --said cases--;

Col. 8, line 17, delete "in that";

Col. 8, line 17, "cased comprises a rigid part at lest" should read --cases comprise a rigid part at least--;

Col. 8, line 26, "claims 15" should read --claim 15--;

Col. 8, line 34, delete "in that";

Signed and Sealed this

First Day of March, 1994

Attest:

BRUCE LEHMAN

*Attesting Officer*   *Commissioner of Patents and Trademarks*